United States Patent [19]

Regueiro

[11] 4,284,941

[45] Aug. 18, 1981

[54] DATA COMMUNICATIONS BETWEEN FIXED AND MOVING TERMINALS

[75] Inventor: William R. Regueiro, Troy, Mich.

[73] Assignee: General Motors Corporation, Detroit, Mich.

[21] Appl. No.: 82,297

[22] Filed: Oct. 5, 1979

[51] Int. Cl.³ .......................... G05D 1/00; B64C 13/18
[52] U.S. Cl. ...................................... 318/587; 318/16; 180/168
[58] Field of Search .......................... 318/16, 587, 653; 180/168; 179/82

[56] References Cited

U.S. PATENT DOCUMENTS

| | | | |
|---|---|---|---|
| 3,076,058 | 1/1963 | Miller | 179/82 |
| 3,361,082 | 1/1968 | Leslie | 318/16 X |
| 3,587,100 | 6/1971 | Doremus | 318/16 X |
| 3,757,887 | 9/1973 | Moore et al. | 318/587 X |
| 3,893,536 | 7/1975 | Marshall | 318/587 X |
| 3,955,051 | 5/1976 | Bitzer et al. | 179/2 BP |
| 4,006,315 | 2/1977 | Halstead | 179/82 |
| 4,023,753 | 5/1977 | Dobler | 246/5 |
| 4,108,269 | 8/1978 | Nakao | 180/168 |

Primary Examiner—B. Dobeck
Attorney, Agent, or Firm—C. R. Meland

[57] ABSTRACT

A data communications system between fixed and moving terminals wherein a conductor connected to the fixed terminal and disposed in the travel path of the moving terminals supports lateral guidance control information for the moving terminals as well as two-way inductive data communications between the fixed terminal and the moving terminals. The fixed (wayside) terminal transmits over the conductor an alternating current lateral guidance signal modulated in accordance with longitudinal control information for each of the moving terminals. Each of the moving terminals, in turn, transmits status information over the conductor to be used for developing control information at the fixed terminal. The fixed terminal employs hybrid transformer techniques in conjunction with precision filtering to enable reception of low-level status information from the moving terminals and concurrent rejection of the modulated lateral guidance signal and other interfering signals.

3 Claims, 4 Drawing Figures

DATA COMMUNICATIONS BETWEEN FIXED AND MOVING TERMINALS

This invention relates to data communications between fixed and moving terminals and more particularly to an automated transportation system wherein a wayside installation controls the operation of a plurality of vehicles traveling over a fixed guideway.

The prior art discloses numerous automated guidance control systems, some of which communicate lateral guidance data from a wayside installation to one or more vehicles via a conductor or conductor pair buried in a guideway defining the vehicle travel path. The wayside installation applies an alternating current signal to the guideway conductor generating an electromagnetic field in the guideway about the conductor. An antenna fixed to the underbody of the vehicle is used to sense the field strength and a vehicle-mounted control system generates a lateral error signal as a function of the sensed field strength relative to an electromagnetic field null existing directly over the conductor. Conventional vehicle servo systems respond to the error signal by making steering adjustments to maintain the vehicle in a predetermined lateral position with respect to the guideway conductor.

It is also known in prior automated transportation art to develop vehicle control data at a wayside installation in response to position or status data communicated from each of the vehicles to the wayside installation and to communicate the vehicle control data to each of the vehicles in order to safely control the operation of a plurality of vehicles along the same travel path. Communications between the wayside installation and the vehicles are often performed in a non-radiative manner over a suitable communication link such as an additional conductor disposed in the guideway. For example, the data may be inductively communicated across an air gap between the conductor and a vehicle-mounted antenna.

Attempts have been made to consolidate lateral and longitudinal communications by modulating the alternating lateral guidance signal in accordance with vehicle control data developed at the wayside installation. In this way, the modulated guidance signal impressed upon the guideway conductor can communicate both lateral guidance and control data from the wayside installation to the vehicles. However, providing vehicle-to-wayside communication over the same conductor presents special difficulties that have not been overcome in the prior art. The difficulties for the most part occur when the wayside installation attempts to receive vehicle transmissions in the presence of the modulated lateral guidance signal. The lateral guidance signal must be of relatively high amplitude and continuously applied to the guideway conductor in order to provide adequate lateral guidance control. By contrast, the vehicle-to-wayside communications are low in amplitude due to the air gap over which the signals must be transmitted and the limited transmit power capability of the vehicles. Moreover, lateral excursions of the vehicle vary the distance between a vehicle-mounted antenna and the guideway conductor, further reducing the amplitude of vehicle transmissions appearing at the wayside installation. As such, the lateral guidance signal represents an extremely large source of interference at the wayside installation with respect to status communications transmitted from the vehicles.

It is therefore an object of this invention to provide a communication system for automated transportation wherein both status communications from a vehicle to a wayside installation and lateral and longitudinal guidance communications from the wayside installation to the vehicle are performed over a single conductor disposed in a guideway defining the vehicle travel path.

It is another object of this invention to provide a communication system between a wayside installation and vehicles controlled by the wayside installation wherein a single buried conductor simultaneously supports lateral guidance information for the vehicles and two-way communication between the vehicles and the wayside installation.

It is another object of this invention to provide a single conductor communication system for automated transportation wherein a wayside installation is capable of receiving low level vehicle-to-wayside communications in the presence of high level wayside-to-vehicle communications.

It is another object of this invention to provide a data communication system between fixed and moving terminals wherein a single conductor connected to the fixed terminal and disposed in the travel path of the moving terminals supports two-way inductive data communications between the fixed terminal and the moving terminals.

In fulfilling these objects this invention provides vehicle-to-wayside data communications by inductive transmission of the data from the vehicles into a guideway conductor disposed along the vehicle travel path and by reception of the data at the wayside installation using hybrid transformer techniques in conjunction with precision passive filtering. Vehicle control data developed at the wayside installation is communicated to the vehicles by transmitting into the guideway conductor an alternating current lateral guidance signal modulated in accordance with the data. Vehicle-to-wayside communications relate to the status of the transmitting vehicle, and wayside-to-vehicle transmissions relate to vehicle control commands.

Figure 1:
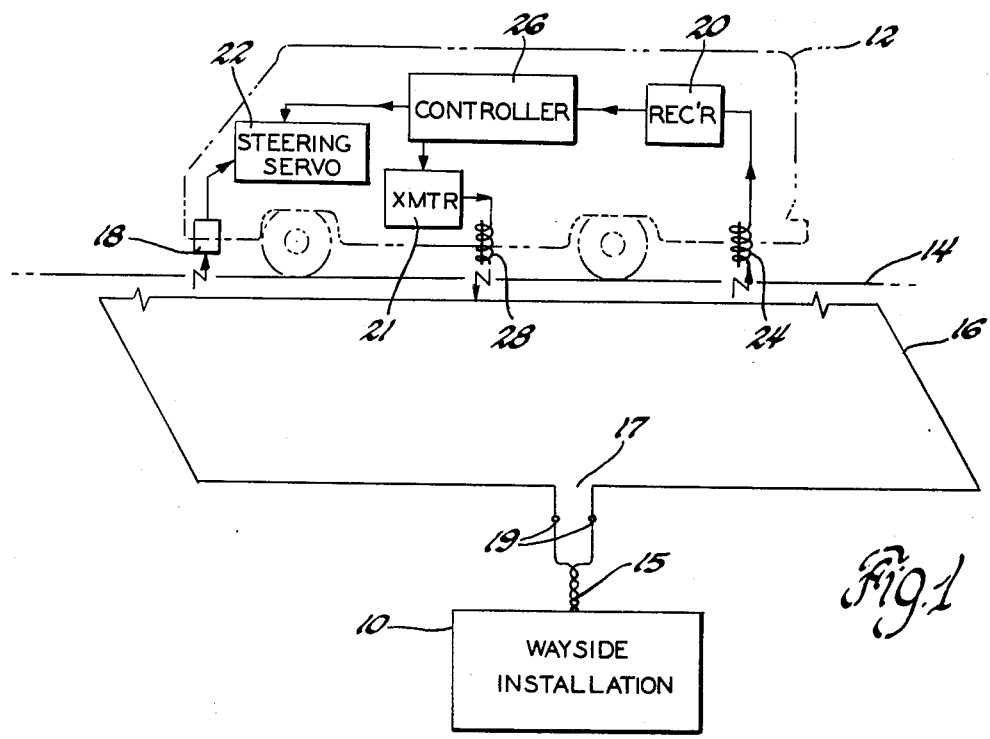
FIG. 1 is a schematic representation of a guideway conductor and a vehicle controlled by a wayside installation in accordance with this invention.

Referring now to the drawings and more particularly to FIG. 1, reference number 10 generally designates a wayside installation for controlling the operation of a vehicle 12 traveling over the surface 14 of a fixed guideway. Vehicle 12 is preferably propelled in a conventional manner by an internal combustion engine although the vehicle type and the specific manner of propulsion does not affect the scope of this invention. Conductor 16 is buried in the guideway and serves as the communication link between wayside installation 10 and vehicle 12. The guideway is arranged in a loop so that conductor 16 nearly closes on itself as shown at the portion of the guideway designated by reference numeral 17. Loop terminals 19 are provided at the ends of conductor 16, and wayside installation 10 is connected to loop terminals 19 by lead-in conductor pair 15. The guidance equipment aboard vehicle 12 is insensitive to the discontinuity at guideway portion 17 and the vehicles proceed across that portion of the guideway as though conductor 16 were continuous. Vehicle-mounted equipment (including various sensing devices) measures and transmits vehicle status information (position, speed, etc.) to wayside installation 10 via guideway conductor 16 and lead-in 15, and wayside installation 10 transmits vehicle control commands to each vehicle 12 via the same conductors. The vehicle control commands are received at vehicle 12 by lateral guidance antenna array 18 and longitudinal guidance antenna 24. Antennas 24 and 28 are shown vertically oriented for the sake of convenience and clarity. However, they are preferably oriented horizontally and perpendicular to guideway conductor 16. The electrical signals received by antenna array 18 are applied to steering servo 22 which is operative to make steering adjustments to maintain vehicle 12 in a predetermined lateral position on the guideway with respect to guideway conductor 16. Antenna array 18 and steering servo 22 may be any of a number of known control systems that sense the strength of an electromagnetic field generated by an alternating current signal in a guideway conductor as a measure of the lateral position error of the vehicle with respect to the location of the guideway conductor. A control system that meets the above specifications is described in a publication presented at the 29th IEEE Conference on Vehicular Technology, entitled, "Automated Control of Guideway Transit Vehicles", G. Harder, R. Smisek; March, 1979.

The control signals induced in antenna 24 are applied to vehicle receiver (REC'R) 20. Receiver 20 demodulates the signals transmitted from wayside installation 10 and applies the information to vehicle controller 26 which causes the vehicle status parameters (position, speed) to conform therewith. It will be appreciated that this operation may include actuation of the vehicle, throttle, brakes, door, trunk, etc. Controller 26 also develops status information from a plurality of vehicle-mounted transducers (not shown) and applies that information in a structured format to transmitter (XMTR) 21 for communication to wayside installation 10 over antenna 28 and guideway conductor 16. Controller 26 may also be connected to steering servo 22 for the purpose of controlling travel path selection as will be later explained. Antennas 18, 24 and 28 inductively communicate across a variable air gap with guideway conductor 16 and each preferably comprises several turns of wire disposed about an air or ferrite core. Although rocking and lateral excursions of vehicle 12 affect the length of the air gap and hence communication efficiency, the air gap may be maintained within acceptable limits with a lateral guidance control system of the type described above. Transmitter 21 and receiver 20 are preferably made with standard electrical components as will be described later, and the structure and operation of wayside installation 10 will be described in detail in reference to FIGS. 2-4.

Figure 2:
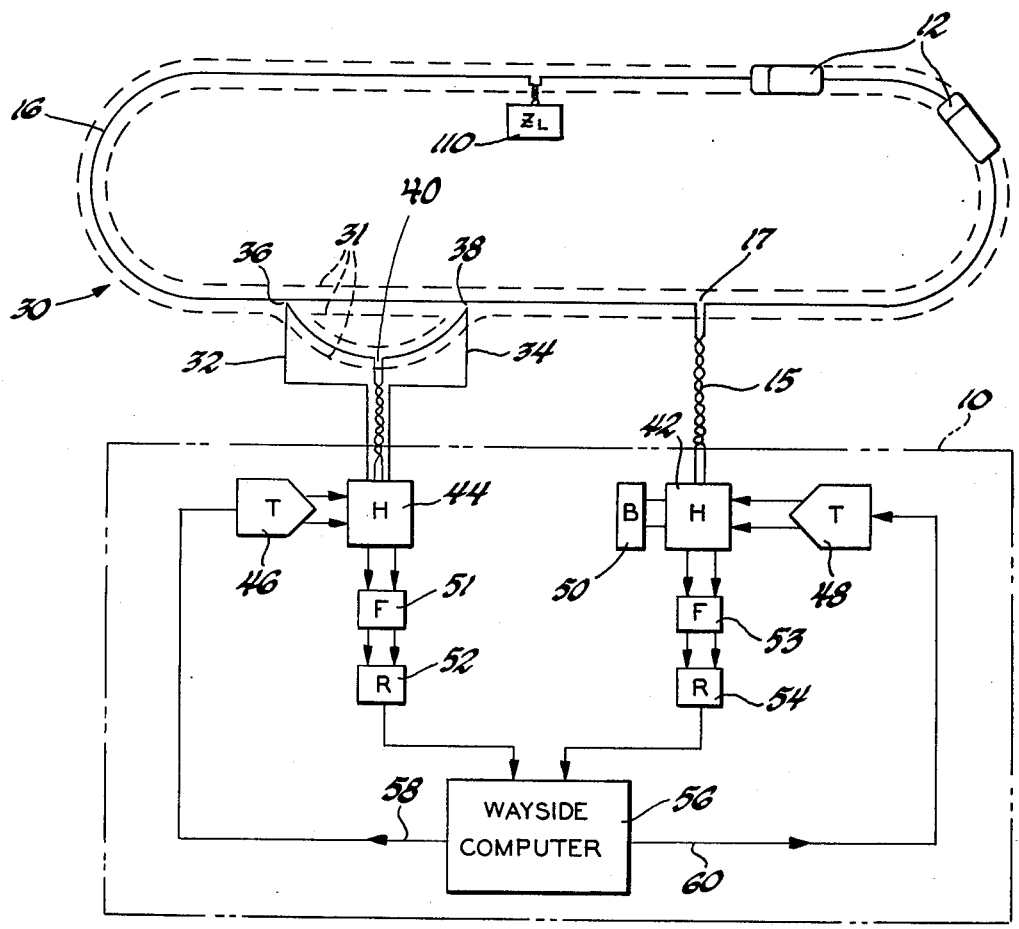
FIG. 2 is a block diagram of a guideway conductor arrangement and a wayside installation made in accordance with this invention.

Referring now to FIG. 2, reference number 30 generally designates a guideway having a Main loop defined by guideway conductor 16 (as shown in FIG. 1) and a Merge/Diverge loop defined by portions of guideway conductors 32 and 34. Dashed lines indicated by reference numeral 31 represent the edges of the vehicle travel paths. The Merge/Diverge loop is provided so that a vehicle 12 may safely exit from the Main loop for an operation requiring stoppage or the deceleration of the vehicle, and safely rejoin the vehicles traveling on the Main loop when the operation is completed. Merge/Diverge loop guideway conductors 32 and 34 are arranged to be in close proximity with Main loop guideway conductor 16 at portions of the guideway designated by reference numerals 36 and 38. The lateral guidance signal applied to the Merge/Diverge loop is of higher frequency than the Main loop lateral guidance signal so that the vehicle lateral guidance equipment may be controlled to follow either loop in accordance with instructions from wayside installation 10. That is, the lateral guidance equipment aboard vehicle 12 may be controlled by conventional filtering techniques so as to be responsive to either the lower frequency Main loop lateral guidance signal or the higher frequency Merge/Diverge lateral guidance signal. Conductor 16 is terminated at the midpoint by impedance 110, the purpose of which will be explained later. Portions of Merge/Diverge guideway conductors 32 and 34 are arranged in close proximity with each other in the guideway portion designated by reference numeral 40. As with guideway portion 17 of the Main loop, vehicles 12 traversing the Merge/Diverge loop pass over guideway portion 40 as though guideway conductors 32 and 34 were continuous at that point. Wayside installation 10 is connected to the Merge/Diverge loop at guideway portions 36, 38, and 40, as illustrated in FIG. 2.

The wayside installation generally designated by reference numeral 10 comprises hybrid transformer units (H) 42 and 44, wayside transmitters (T) 46 and 48, balance load (B) 50, filter units (F) 51 and 53, wayside receivers (R) 52 and 54, and wayside computer 56. The Main and Merge/Diverge loop guideway conductors are connected to hybrid transformer units 42 and 44, respectively, the operation of which will be explained in reference to FIGS. 3 and 4. Balance load 50 is connected to hybrid transformer 42 and may comprise passive impedance devices (resistors, capacitors, and inductors) chosen to match the combined impedance of guideway conductor 16, lead-in pair 15, and impedance 110. The purpose of balance load 50 is discussed in reference to FIG. 3. Information transmitted by a vehicle 12 while traveling over Main loop guideway conductor 16 is received and demodulated by wayside receiver 54 through hybrid transformer unit 42 and filter unit 53, and information transmitted by a vehicle 12 while traveling over Merge/Diverge loop guideway conductors 32 or 34 is received and demodulated by wayside receiver 52 through hybrid transformer unit 44 and filter unit 51. The demodulated data signals appearing at the output terminals of wayside receivers 52 and 54 are applied as inputs to wayside computer 56 which applies vehicle control signals to wayside transmitters 46 and 48 as a function of the status data received from the vehicles 12. Wayside transmitter 46 transmits a modulated guidance signal at a first frequency according to output 58 of wayside computer 56 over the Merge/Diverge loop through hybrid transformer unit 44. Wayside transmitter 48 transmits a modulated guidance signal at a second frequency in accordance with output 60 of wayside computer 56 over the Main loop through hybrid transformer unit 42. As noted above, Main loop and Merge/Diverge loop communications are performed at different frequencies to enable travel path selection by the vehicle-mounted lateral guidance equipment. The wayside-to-vehicle signals are preferably coded so that unique information may be communicated to any designated vehicle 12 traveling over the same loop. This obviously may be accomplished by devoting a portion of the data transmission to vehicle identification coding, each vehicle being associated with a particular code. Vehicle transmissions may be similarly coded so that wayside computer 56 may identify the source of the received status data.

Wayside receivers 52 and 54, wayside transmitters 46 and 48, filter units 51 and 53, and vehicle receiver 20 and transmitter 21 are preferably standard, readily available components. The transmitters may include as will be well known to those skilled in the art of communications an oscillator-modulator, a differential line receiver, and a power amplifier; the receivers may contain an amplifier, various filters, a demodulator, and a differential line driver. Wayside computer 56 also forms no part of this invention, and as such may be implemented with any of a number of well known analog or digital devices capable of receiving status data from a plurality of vehicles and calculating vehicle speed and position data for each of the vehicles as a function of the status data and the guideway configuration. Filter units 51 and 53 preferably comprise off-the-shelf sharp roll-off passive and active filters chosen to reject signal frequencies associated with local transmitter and adjacent loop interference.

Figure 3:
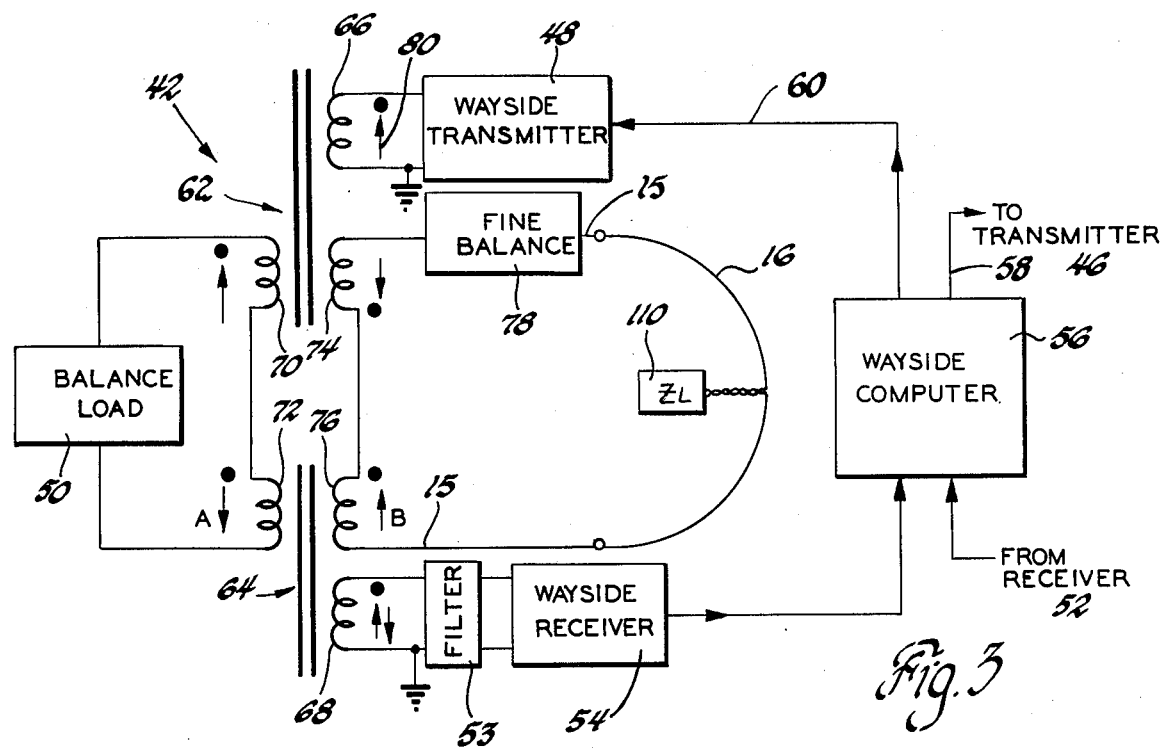
FIG. 3 illustrates the hybrid transformer technique used in conjunction with the Main loop of the guideway.

FIG. 3 illustrates the portion of wayside installation 10 associated with the Main loop; the reference numerals used in FIGS. 1 and 2 are also used in FIG. 3 to designate corresponding components. Transformer unit 42 comprises two hybrid transformers 62 and 64, each having three windings. The turns ratio of the various windings may be chosen as a function of numerous design considerations, as will be apparent to those skilled in the art. In the preferred embodiment, windings 66, 70, and 74 are wound 1/2/2; and windings 72, 76, and 68 are wound 2/2/1. Winding 66 of transformer 62 is connected to wayside transmitter 48, and winding 68 of transformer 64 is connected to wayside receiver 54 through filter unit 53. Balance load 50 is connected in a series circuit with winding 70 of transformer 62 and winding 72 of transformer 64. Guideway conductor 16 is connected in a series circuit with winding 74 of transformer 62 and winding 76 of transformer 64. Fine balance unit 78 represents a variable impedance that may comprise passive impedance devices, and may be placed in series with guideway conductor 16 as shown for reasons that will be discussed later. Wayside transmitter 48 and receiver 54 are connected to wayside computer 56 as shown in FIG. 2.

The windings of transformers 62 and 64 are directionally wound as shown by the conventional placement of winding dots. If an electrical signal having a voltage polarity as designated by arrow 80 were applied to winding 66 by wayside transmitter 48, the voltages resulting in each of the other windings would be as shown by the respective arrows. Voltages of unequal magnitude and opposite polarity are induced in windings 70 and 72, as well as in windings 74 and 76. Consequently, windings 72 and 76 induce voltages of opposite polarity in winding 68. If the combined impedance of the Main loop (guideway conductor 16, fine balance unit 78, and impedance 110) is substantially equal to the impedance of balance load 50, the voltages induced in winding 68 will be equal in magnitude as well as opposite in polarity. Moreover, one-half of the signal power transmitted by wayside transmitter 48 into winding 66 will be dissipated in balance load 50 and the other one-half will be dissipated in the Main loop. Since the voltages induced in winding 68 are of substantially equal magnitude and opposite polarity, substantially no lateral guidance signal power will be dissipated in wayside receiver 54. Thus, signals originating in wayside transmitter 48 are communicated to the vehicles via guideway conductor 16 but are substantially isolated from wayside receiver 54. Conversely, status signals originating in a vehicle transmitter 21 induce voltages of equal magnitude and opposite polarity in windings 70 and 72, and voltages of equal magnitude in windings 66 and 68. That is, vehicle-to-wayside signals are equally dissipated in the loads associated with windings 66 and 68, and essentially no power is dissipated in balance load 50. Signals thereby induced in winding 66 have no effect other than the generation of heat. Due to the above-described relationships, the modulated lateral guidance signal originating in wayside transmitter 48 may be received by vehicle receiver 20—yet not by wayside receiver 54—while status information originating in vehicle transmitter 21 may be received by wayside receiver 54. As indicated above, the penalty exacted for this performance is that one-half of the wayside transmitted power is wasted in balance load 50, and one-half of the vehicle transmitted power reaching wayside installation 10 is wasted in the load associated with winding 66. When the impedance of balance load 50 and the Main loop are substantially equal, however, local interference from wayside transmitter 48 is reduced by as much as 40 dB at wayside receiver 54. To this end, fine balance unit 78 is provided in series with guideway conductor 16 so that a precise balance may be achieved. Further signal enhancement (up to 50 dB) is provided by conventional passive and active filter unit 53 chosen to reject the modulated guidance signal, interference from the Merge/Diverge loop, and other ambient interference.

Figure 4:
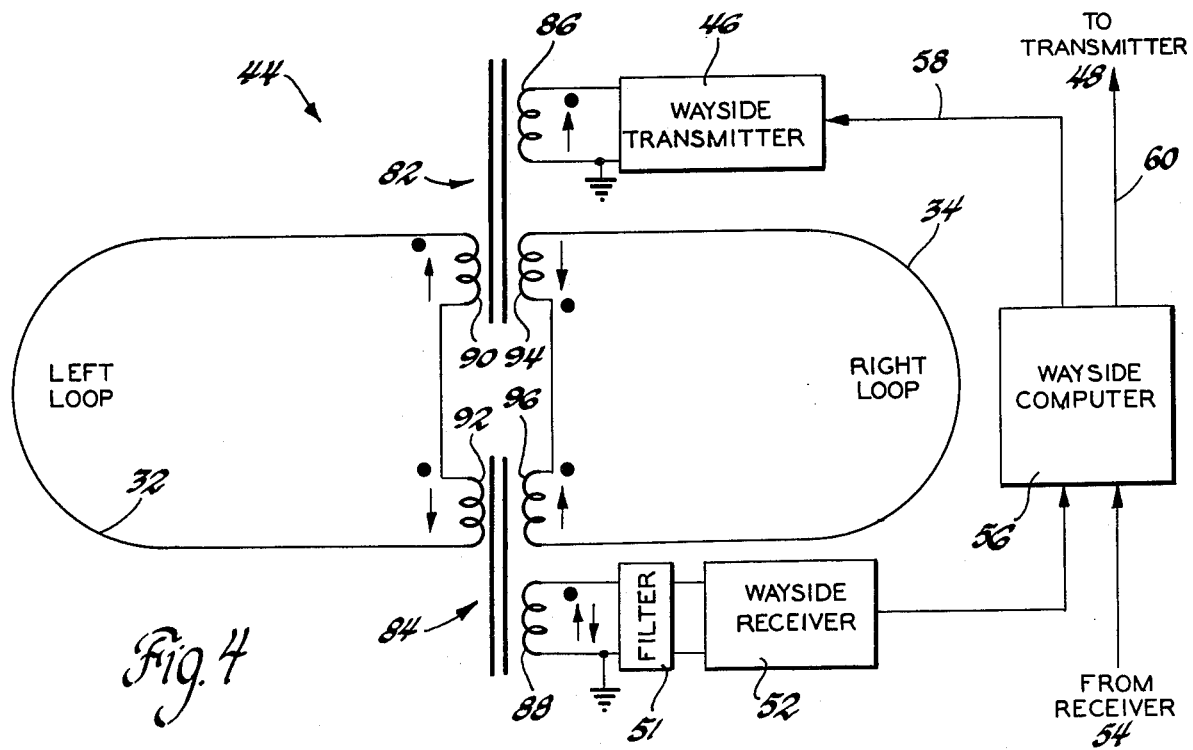
FIG. 4 illustrates the hybrid transformer technique used in conjunction with the Merge/Diverge loop of the guideway.

FIG. 4 illustrates the portion of wayside installation 10 that corresponds to the Merge/Diverge loop comprising guideway conductors 32 and 34. The various components that are shown in more than one Figure are identified by corresponding reference numerals. Transformer unit 44 comprises hybrid transformers 82 and 84 each having three windings. The turns ratio of the various windings may be chosen as a function of numerous design considerations, as will be apparent to those skilled in the art. In the preferred embodiment, windings 86, 90, and 94 are wound 1/2/2, and windings 92, 96, and 88 are wound 2/2/1. Winding 86 of transformer 82 is connected to wayside transmitter 46 and winding 88 of transformer 84 is connected to wayside receiver 52 through filter unit 51. Windings 90 and 92 are connected in series with guideway conductor 32 (left loop) and windings 94 and 96 are connected in series with guideway conductor 34 (right loop). Wayside transmitter 46 and wayside receiver 52 are connected to wayside computer 56 as shown in FIG. 1.

The windings of transformers 82 and 84 are directionally wound as shown by conventional placement of winding dots. Transformer unit 44 operates in the same manner as transformer unit 42 with the exception of balance load 50. Since the Merge/Diverge loop is formed with two symmetrical guideway conductors (32 and 34), there is no need for a balance load; each guideway conductor acts as a balance for the other. As a result, a modulated lateral guidance signal originating in wayside transmitter 46 will be equally dissipated in guideway conductors 32 and 34, and substantially isolated from wayside receiver 52. Conversely, status signals originating in vehicle transmitter 21 while vehicle 12 is traveling over either guideway conductor 32 or 34 are equally dissipated in the loads connected to windings 86 and 88, and not in the load connected to the windings associated with the other guideway conductor.

As with the Main loop arrangement illustrated in FIG. 3, the performance of this arrangement is dependent upon the degree to which the impedance of guideway conductor 32 balances the impedance of guideway conductor 34. In this embodiment, a precise balance is achieved without the use of a fine balance impedance since guideway conductor 32 and guideway conductor 34 are inherently balanced. As with the Main loop arrangement illustrated in FIG. 3, the Merge/Diverge loop arrangement results in a reduction of local interference from wayside transmitter 46 by up to 40 dB at wayside receiver 52. Additional signal enhancement (up to 50 dB) is provided by conventional passive and active filter unit 51, designed to reject the modulated guidance signal, interference from the Main loop, and other ambient noise.

Portions of the lead-in conductors that connect each of the guideway loops to wayside installation 10 are twisted together as shown in FIG. 2. By transformer action the signal in each twisted conductor is 180° out of phase with the signal in the conductor about which it is twisted so that any signals radiating from the conductors are cancelled by destructive interference. It should be appreciated that this technique operates to limit interference between the Main loop and the Merge/Diverge loop, especially in the vicinity of wayside installation 10. As was mentioned earlier, Main loop and Merge/Diverge loop communications are performed at substantially different frequencies to facilitate travel path selection with vehicle lateral guidance equipment. As indicated above, the use of dissimilar communication frequencies also operates to reduce the effect of mutual interference between the Main and Merge/Diverge loops in that filter units 51 and 53 are designed to reject adjacent loop interference.

The communication frequencies used to implement this invention are preferably chosen so as to be within the non-radiative standards promulgated by the Federal Communications Commission (FCC). According to the preferred embodiment of this invention, the communication frequencies for guideway conductor excitation are selected so that the coupling across the air gap between the guideway conductors and the vehicle antennas is for the most part inductive (non-radiative). This is basically achieved by employing communication frequencies such that the ratio of the signal wavelength to the guideway conductor length is equal to or greater than eight (8). It should be appreciated that this requirement places a limitation on the communication frequencies as well as the length of the guideway conductors. In the preferred embodiment, all communications are performed with Frequency Shift Key/Non-Return-to-Zero (FSK/NRZ) modulation. In the Main loop, wayside-to-vehicle signals modulate between 4.0 kilohertz and 5.0 kilohertz; vehicle-to-wayside signals alternate between 39 kilohertz and 41 kilohertz. In the Merge/Diverge loop, wayside-to-vehicle signals alternate between 13.3 kilohertz and 14.7 kilohertz; vehicle-to-wayside transmissions alternate between 59 kilohertz and 61 kilohertz. A simple calculation based on the above-mentioned ratio and frequencies reveals that a Main loop guideway conductor length of 4.5 miles or less will result in satisfactory inductive coupling across the air gap. Although the communications of this invention are preferably performed by FSK modulations, it should be apparent that other types of modulation will work equally as well, provided that an alternating current signal is continuously applied to the guideway conductors. This is required, of course, to insure a lateral guidance signal at all times.

Depending upon the communication frequency employed and the length of the guideway conductors, standing wave current nulls may occur at integral quarter wavelength multiples along the length of a guideway conductor. When according to the preferred embodiment of this invention, a vehicle traversing the Main loop transmits at a frequency of 41 kilohertz, current nulls occur at intervals of approximately 1.1 miles along the length of guideway conductor 16. Since the occurrence of the current nulls may impede satisfactory reception of vehicle-to-wayside communications, terminating impedance 110 is inserted at the midpoint of guideway conductor 16 in order to alter the current distribution in the conductor and reduce the depth of the current nulls. It should be apparent that in some applications, the communication frequencies and the guideway conductor length may be selected so as to not require the use of a terminating impedance such as impedance 110. The Merge/Diverge loop, for example, is much shorter than the Main loop so that standing wave current nulls are not encountered at the communication frequencies used, and a terminating impedance is not required.

The operation of the control system with respect to data communications will now be described. A polling procedure is implemented whereby wayside installation 10 sequentially communicates with each vehicle 12, transmitting command data to the vehicle and receiving status data from the vehicle. The first portion of a command message transmitted from wayside installation 10 includes one or more bits coded to identify the vehicle with which wayside installation 10 intends to communicate. Each vehicle monitors the communication, comparing the identification bits with identification bits stored in a vehicle controller 26. The identification bits correspond in only one of the vehicles, and the vehicle alone continues to "listen" to the communication. As was indicated before, the wayside-to-vehicle communication comprises control data relating to the desired position and speed of the vehicle. The communication may also include one or more bits dedicated to error detection in the reception of a communication as will be explained later. Once the vehicle has received the entire wayside communication, the vehicle begins to communicate status information to wayside installation 10. As indicated before, the status communication from the vehicle includes data pertaining to vehicle position and status (operating parameters, such as engine temperature), as well as error detection data. As soon as the wayside-to-vehicle communication is complete, wayside installation 10 proceeds to communicate with the next vehicle in the same manner as indicated above. That is, wayside installation 10 communicates command data to a second vehicle while receiving status data from a first vehicle. The number of vehicles that may be so serviced by wayside installation 10 is in part a function of the data rate of the communication. When operated according to the preferred embodiment, data rates of up to 1200 bits per second were achieved with the communications system of this invention.

If wayside installation 10 fails to receive a status communication from a vehicle it has polled, the command data is recommunicated to the vehicle. The error detection procedure for verifying complete reception of each communication may be performed by comparing the sum of the bits transmitted with the sum of the bits received. The bit sum of the communication may be independently calculated at both wayside installation 10 and the respective vehicle, and the resultant bit sum may be transmitted as part of each normal communication. For example, each wayside-to-vehicle communication may include data corresponding to the bit sum calculated at wayside installation 10, and each vehicle-to-wayside communication may include data corresponding to the bit sum calculated at the transmitting vehicle. The bit sums may be compared at the terminal receiving the communication to determine if a repeat transmission is requred.

It should be apparent that the details of operation presented above are so provided in order to facilitate a complete understanding of this invention and that they may be modified without departing from the spirit of this invention.

As it has been described, this invention broadly relates to a data communications system between a fixed terminal and moving terminals whereby the fixed terminal controls the operation of the moving terminals. Some applications for this communications system include mass transit people movers, warehouse vehicle control, vehicle testing and assembly line operations.

It should be apparent that the guideway configurations shown in FIG. 2 may be modified to suit a particular application or need without departing from the scope or spirit of this invention. For example, the guideway conductors of the Merge/Diverge loop could be differently arranged to form a complete loop. However, FIG. 2 illustrates a conventional guideway configuration and it is not considered necessary to describe or illustrate other guideway arrangements since to do so would not further aid a complete understanding of this invention.

The embodiments of the invention in which an exclusive property or privilege is claimed are defined as follows:

1. A communications system for automated guidance transportation wherein a vehicle communicates status information to a wayside installation and the wayside installation communicates lateral guidance and control information to the vehicle comprising:
    a conductor defining a course over which said vehicle is to travel, said conductor having a loop closing portion whereat the ends of said conductor form loop terminals;
    first and second wayside transformers, each of said transformers having first, second, and third windings;
    a first circuit comprising in series connection, said third windings of said first and second transformers and said loop terminals;
    an electrical load having an impedance substantially matched with that of said conductor;
    a second circuit comprising in series connection said load and the first windings of said first and second transformers;
    means connecting said second winding of said first transformer to a wayside transmitter for applying a lateral guidance signal to said conductor and for modulating said guidance signal in accordance with control information for said vehicle;
    means connecting said second winding of said second transformer to a wayside receiver for receiving information transmitted into said conductor by said vehicle, the turns ratio and relative winding polarity of said transformer windings being such that signals transmitted from a vehicle into said conductor are received in said wayside receiver, and signal transmitted by said wayside transmitter for reception by said vehicle induce substantially equal and opposite voltages in said second winding of said second transformer to thereby substantially isolate said wayside receiver from signals transmitted by said wayside transmitter.

2. A communications system for automated guidance transportation wherein a vehicle communicates status information to a wayside installation and the wayside installation communicates lateral guidance and control information to the vehicle comprising:
    a guideway conductor terminated substantially at its midpoint by an electrical guideway impedance, the ends of said conductor and said electrical impedance being arranged so that said conductor defines a closed course for said vehicle;
    first and second wayside transformers, each of said transformers having first, second and third windings;
    a first wayside circuit comprising in series connection said third windings of said first and second transformers and the ends of said guideway conductors;
    an electrical load having an impedance substantially matched with the combined impedance of said guideway conductor and said guideway impedance;
    a second wayside circuit comprising in series said electrical load and the first windings of said first and second transformers;
    means connecting said second winding of said first transformer to a wayside transmitter for applying a lateral guidance signal to said guideway conductor and for modulating said guidance signal in accordance with control information for said vehicle;
    means connecting said second winding of said second transformer to a wayside receiver for receiving information transmitted into said guideway conductor by said vehicle, the turns ratio and relative winding polarity of said transformer windings being such that signals transmitted from a vehicle into said guideway conductor are received in said wayside receiver, and signals transmitted by said wayside transmitter for reception by said vehicle induce substantially equal and opposite voltages in said second winding of said second transformer to thereby substantially isolate said wayside receiver from signals transmitted by said wayside transmitter.

3. A communication system for automated guidance transportation wherein a vehicle communicates status information to a wayside installation and the wayside installation communicates lateral guidance and control information to the vehicle comprising:
    a travel path for said vehicle defined by portions of first and second conductors, at least one end of each of said travel path portions being arranged in close proximity with the other in substantially linear relationship;

a first circuit comprising in series connection said third windings of said first and second transformers and the ends of said first conductor;

a second circuit comprising in series connection said first windings of said first and second transformers and the ends of said second conductor;

means connecting said second windings of said first transformer to a wayside transmitter for applying a lateral guidance signal to said first and second conductors and for modulating said guidance signal in accordance with control information for said vehicle;

means connecting said second windings of said second transformer to a wayside receiver for receiving information transmitted into said first or second conductors by said vehicle, the turns ratio and relative winding polarity of said transformer windings being such that signals transmitted from a vehicle into said first or second conductors are received in said wayside receiver, and signals transmitted by said wayside transmitter for reception by said vehicle, produce substantially equal and opposite signals in said second winding of said second transformer to thereby substantially isolate said wayside receiver from signals transmitted by said wayside transmitter.

* * * * *

UNITED STATES PATENT AND TRADEMARK OFFICE
CERTIFICATE OF CORRECTION

PATENT NO. : 4,284,941

DATED : August 18, 1981

INVENTOR(S) : William R. Regueiro

It is certified that error appears in the above—identified patent and that said Letters Patent is hereby corrected as shown below:

Column 8, line 46, after "and", "the" should read -- that -- .

Column 10, line 32, "conductors;" should read -- conductor --.

Column 10, line 59, "communication" should read -- communications -- .

Signed and Sealed this

Third Day of November 1981

[SEAL]

Attest:

GERALD J. MOSSINGHOFF

Attesting Officer     Commissioner of Patents and Trademarks